Patented Apr. 6, 1937

2,076,184

UNITED STATES PATENT OFFICE 2,076,184

PROCESS FOR DEHYDRATION OF ACETIC ACID AND OTHER LOWER FATTY ACIDS

Donald F. Othmer, Brooklyn, N. Y., assignor to Tennessee Eastman Corporation, Kingsport, Tenn., a corporation of Virginia No Drawing. Application December 20, 1933, Serial No. 703,317

18 Claims. (Cl. 260—122)

This invention relates to a process for the concentration of aqueous solutions of acetic acid, the removal of the water therefrom, and the production thereby of substantially pure, "glacial" acetic acid.

Various solvent materials have been proposed for extracting acetic acid from its aqueous solutions by counter current liquid contact. The acetic acid after extraction may be more readily recovered from the solvent than from the water originally present. Still other methods have concerned themselves with the distillation of the aqueous solution in the presence of an auxiliary liquid, which, by reason of its insolubility in water and the vapor pressure relations dependent thereupon, brings over the water in a low boiling vaporous mixture, sometimes called an "azeotropic" mixture. In this process, see for example, Othmer U. S. Patents No. 1,917,391 and No. 2,028,800, it is usual practice to condense the vaporous mixture of water and withdrawing agent, separate the two layers of water and water insoluble third liquid respectively, discharge the water layer to waste (or to an auxiliary still for removing the trace of third liquid dissolved therein) and return the third liquid or withdrawing agent to the head of the column as reflux wash for the purpose of bringing over more water in a continuous operation.

I have found that the symmetrical ethers boiling within a range of 85–95° C. and exemplified by n-propyl ether and allyl ether, are satisfactory materials to be used in either of these processes, or in the combined operation wherein, after systematic extraction of the aqueous acetic acid, the water dissolved with the acetic acid in the solvent layer is ejected in a so-called "azeotropic" distillation with the solvent itself. The use of higher ethers such as n-butyl ether or iso-butyl ether is found to be disadvantageous because of the difficulty of separation of the ether itself from acetic acid.

The use of ethyl ether and of iso-propyl ether are old in the extraction process for acetic acid recovery. The use of either of these ethers in plant operations is accompanied by considerable losses due to the high rates of volatilization; and I have found that the symmetrical ethers of a boiling range between 85–95° C. may be used for this purpose with negligible losses due to evaporation. After the extraction operation is finished, the extracting solvent is found to contain, besides the acetic acid, an amount of water which is unavoidably dissolved. This amount of water will vary with each extracting material employed, and with the strength of acid in the original feed, and hence in the saturated solvent. I have found that, in every case, the amount of water dissolved by n-propyl ether, one of my preferred materials, is considerably less than the amount dissolved under the same conditions with either isopropyl ether or ethyl ether. This means that a drier acid is produced when the solvent is removed; or if anhydrous acid is desired in a second step, the cost of the second step will be reduced.

It is sometimes desirable to completely dehydrate the acid in a second step comprising the use of a so-called "azeotropic" distillation in which the extracting solvent itself is used as the withdrawing agent, for removing the water present at the completion of the extraction step. Ethyl ether does not have suitable properties to be useful as a withdrawing agent, and when isopropyl ether is so used, approximately 21 parts by weight of the ether must be distilled for every part of water removed. With n-propyl ether, on the contrary, only about seven to eight parts of ether must be distilled to remove one part of water. Since the latent heats of vaporization are about the same for these ethers, it follows that the additional amount of heat required for removing the water when using propyl ether, one of my preferred materials, is only about one-third as much as when using isopropyl ether. For the same reason, the capacity of the distilling column will be increased almost in inverse ratio because of the smaller amount of vapors to be handled per unit of water discharged.

Likewise, my preferred materials have considerable merit over ethyl acetate, another material old in the art for use as an extracting and/or withdrawing material. Not only is ethyl acetate much less efficient as an extracting liquid since it dissolves considerably more water under the same conditions, but it has a considerable lower power for withdrawing water in an azeotropic distillation than my preferred materials—although it is somewhat better than isopropyl ether in this regard. An additional disadvantage of ethyl acetate is its tendency to hydrolyze to give ethyl alcohol which, in the mixture with ethyl acetate, still further reduces the latter's efficiency both as an extracting and as a withdrawing agent. The ethyl alcohol so formed may be lost in greater or less amount along with the waste water, and this loss may have an appreciable factor in the cost of operation. My preferred materials, on the contrary, show no tendency to hydrolyze under the conditions to be met with in this use, and may be used indefinitely without any loss due to decomposition.

I have also found that symmetrical ethers boiling in the range between 85 and 95° C. are useful for removing the water by extraction and/or azeotropic distillation from mixtures with other fatty acids such as formic, propionic and butyric or any mixture of two, three or four of these acids and water. In this regard, these ethers are particularly advantageous as compared to the esters, which have been widely used in the past, because of the tendency of esters to hydrolyze to the constituent alcohol and acid. The alcohol may then recombine with another acid under the conditions of operation to give a new ester which will have entirely different extractive characteristics and, especially, a different boiling point. The ester formed during the continual operation of the process may gradually build up to such an amount that the process as originally operated becomes inoperative. As mentioned above, my preferred materials are entirely stable under the conditions of operation and may be used indefinitely with any mixture of these acids, without decomposition or change in properties in any way.

It will be understood by those skilled in the art that many arrangements of standard equipment may be used to carry out the features of my invention, and may be within the spirit of my disclosure as limited and defined by the appended claims.

In particular, it may be noted that any standard type of extractor and/or distilling column or columns which are efficient for this purpose may be used, and that the dilute acid may be fed into the distilling column or columns either in a liquid or vaporous state, and the discharged acid may be either partly or completely dehydrated and passed from the distillation system in either a liquid or vaporous condition. Also, if the so-called "azeotropic" distillation is employed, the condensate from the condenser may be separated into layers comprising substantially pure water and substantially pure withdrawing agent respectively, and the former discharged to waste or to an auxiliary still for recovering the trace of withdrawing agent dissolved therein, while the latter is returned to the head of the still as reflux wash.

Having described my invention, what I claim and desire to secure by Letters Patent, is as follows:—

1. The process for continuously separating water from its solution with one or more of the lower fatty acids, in which the dilute acid or acids are extracted with a symmetrical ether having a normal boiling point between 85 and 95° C., the aqueous layer discharged after substantially complete exhaustion, the ether layer, containing substantially all of the acid originally present and part of the water, passed to a column still in which the ether removes the water in an azeotropic distillation and the lower fatty acid or acids are discharged in a concentrated condition.

2. In the process of dehydrating aqueous acetic acid, the use of allyl ether for extracting the acetic acid from the water.

3. The process of dehydrating aqueous acetic acid by distillation in the presence of allyl ether, said allyl ether acting as a withdrawing agent for the water.

4. The process for continuously separating water from its solution with acetic acid, in which the dilute acid is extracted with a symmetrical ether having a normal boiling point between 85 and 95° C., the aqueous layer discharged after substantially complete exhaustion, the ether layer, containing substantially all of the acid originally present and part of the water, passed to a column still in which the ether removes the water in an azeotropic distillation and the acetic acid is discharged in a concentrated condition from the column base.

5. The process for separating water from its solution with acetic acid, in which the dilute acid is extracted with n-propyl ether, the aqueous layer discharged after substantially complete exhaustion, the ether layer, containing substantially all of the acid originally present and part of the water, passed to a column still in which the ether removes the water in an azeotropic distillation, and the acetic acid is discharged in a concentrated condition from the column base.

6. The process for separating water from its solution with acetic acid, in which the dilute acid is extracted with allyl ether, the aqueous layer discharged after substantially complete exhaustion, the ether layer, containing substantially all of the acid originally present and part of the water, passed to a column still in which the ether removes the water in an azeotropic distillation, and the acetic acid is discharged in a concentrated condition from the column base.

7. The process for separating water from acetic acid by distillation with allyl ether, in which the water and ether forms an azeotropic mixture in the still head, the mixture condensed, the condensate separated into a water and an ether layer, the water layer discharged, and the ether layer returned to the still head to remove more water, and the process conducted so as to give substantially dry acetic acid in the still pot.

8. The process of dehydrating dilute aqueous solutions of one or more of the lower fatty acids by cold extraction, which comprises the use of symmetrical ethers having normal boiling points between 85 and 95° C. for extracting the acid or acids from the water by counter-current contact of the liquids.

9. The unitary step process of dehydrating solutions comprising substantially water and one or more of the lower fatty acids by azeotropic distillation in the presence of a symmetrical ether having a normal boiling point between 85 and 95° C., the said ether acting as the withdrawing agent for the water.

10. The process of dehydrating dilute aqueous acetic acid, comprising the extraction of the acetic acid from the water by the use of n-propyl ether.

11. The unitary step process of dehydrating a substantially binary solution of water and acetic acid by distillation in the presence of n-propyl ether, said n-propyl ether acting as the withdrawing agent for the water.

12. The unitary step process of separating water from a binary solution of acetic acid and water by distillation with a symmetrical ether having a boiling point between 85 and 95° C., in which the water and ether form an azeotropic mixture in the still head, the mixture condensed, the condensate separated into a water and ether layer, the water layer discharged, and the ether layer returned to the still head to remove more water, the process being conducted so as to give substantially dry acetic acid in the still pot.

13. The unitary step process of separating water from a binary solution of acetic acid and water by distillation with n-propyl ether in which the water and ether form an azeotropic mixture in the still head, the mixture condensed, the condensate separated into a water and an ether layer, the water layer discharged, and the ether layer returned to the still head to remove more water, the process being conducted so as to give substantially dry acetic acid in the still pot.

14. The unitary step process of separating water from a dilute water solution of acetic acid by distillation with a symmetrical ether having a boiling point between 85 and 95° C., in which the water and ether form an azeotropic mixture in the still head, the mixture condensed, the condensate separated into a water and ether layer, the water layer discharged, and the ether layer returned to the still head to remove more water, and the process conducted so as to give substantially dry acetic acid in the still pot.

15. The unitary step process of separating water from a dilute water solution of acetic acid by distillation with n-propyl ether, in which the water and ether form an azeotropic mixture in the still head, the mixture condensed, the condensate separated into a water and an ether layer, the water layer discharged, and the ether layer returned to the still head to remove more water, and the process conducted so as to give substantially dry acetic acid in the still pot.

16. The unitary step process of separating water from a dilute water solution containing one or more of the lower fatty acids by distillation with a symmetrical ether having a boiling point between 85 and 95° C., in which the water and ether form an azeotropic mixture in the still head, the mixture condensed, the condensate separated into a water and an ether layer, the water layer discharged, and the ether layer returned to the still head to remove more water, and the process conducted so as to give substantially dry fatty acid or acids.

17. A process for dehydrating aqueous solutions of one or more of the lower fatty acids by steps including azeotropic distillation in a distillation column, which comprises supplying an aqueous solution of fatty acid to the column in the vaporous state, and subjecting the aqueous acid to an azeotropic distillation treatment in the presence of a symmetrical ether having a normal boiling point between 85 and 95° C., whereby water is removed.

18. A process for dehydrating watery solutions containing at least one of the lower fatty acids by steps wherein the bulk of the water removed from the watery solutions is removed by the use of a symmetrical ether having a normal boiling point between 85 and 95° C., which comprises subjecting said solutions to an azeotropic distillation treatment in the presence of a symmetrical ether having a normal boiling point between 85 and 95° C., whereby a substantial amount of water is removed.

DONALD F. OTHMER.